(12) United States Patent
He (10) Patent No.: US 9,310,550 B2
(45) Date of Patent: Apr. 12, 2016

(54) POSITIONING DEVICE FOR LIGHT GUIDE PLATE AND BACKLIGHT MODULE

(71) Applicant: Shenzhen China Star Optoelectronics Technology Co., Ltd., Shenzhen, Guangdong (CN)

(72) Inventor: Hu He, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 304 days.

(21) Appl. No.: 13/980,926

(22) PCT Filed: Jun. 27, 2013

(86) PCT No.: PCT/CN2013/078177
§ 371 (c)(1),
(2) Date: Jul. 22, 2013

(87) PCT Pub. No.: WO2014/139241
PCT Pub. Date: Sep. 18, 2014

(65) Prior Publication Data
US 2014/0268880 A1  Sep. 18, 2014

(51) Int. Cl.
*G02F 1/13357* (2006.01)
*F21V 8/00* (2006.01)

(52) U.S. Cl.
CPC .................... *G02B 6/0088* (2013.01)

(58) Field of Classification Search
CPC . F21V 17/162; F21V 2200/20; G02B 6/0086; G02B 6/0088; G02B 6/0093
See application file for complete search history.

(56) References Cited

U.S. PATENT DOCUMENTS

| | | | | |
|---|---|---|---|---|
| 6,046,785 | A | * | 4/2000 | Won ............................... 349/58 |
| 6,992,736 | B2 | * | 1/2006 | Saito et al. ..................... 349/58 |
| 7,344,294 | B2 | * | 3/2008 | Hsieh et al. .................. 362/633 |
| 7,364,345 | B2 | * | 4/2008 | Fang ............................. 362/634 |
| 7,575,360 | B2 | * | 8/2009 | Ohno et al. ................... 362/633 |
| 7,796,211 | B2 | * | 9/2010 | Yu .................................. 349/65 |
| 8,092,069 | B2 | * | 1/2012 | Chuang et al. ............... 362/633 |
| 8,740,446 | B2 | * | 6/2014 | Huang et al. ................. 362/633 |
| 8,752,992 | B2 | * | 6/2014 | Chen et al. ................... 362/608 |
| 8,964,142 | B2 | * | 2/2015 | Zhang et al. ................... 349/58 |
| 2007/0127144 | A1 | * | 6/2007 | Gao ............................. 359/820 |
| 2014/0104538 | A1 | * | 4/2014 | Park et al. ...................... 349/60 |
| 2014/0119055 | A1 | * | 5/2014 | Zhang ........................... 362/621 |

FOREIGN PATENT DOCUMENTS

| | | |
|---|---|---|
| CN | 202140993 U | 2/2012 |
| CN | 102734713 A | 10/2012 |
| WO | WO2012153615 A1 | 4/2012 |

* cited by examiner

*Primary Examiner* — Ismael Negron
(74) *Attorney, Agent, or Firm* — Andrew C. Cheng (57) ABSTRACT

The positioning device includes a backboard and a spring member arranged adjacent to the incident surface of the light guide plate, and includes a connector attached to the backboard, and a positioning hand having a fixing end and a free end. The fixing end is secured to the connector, and the free end abuts against to the sidewall of the light guide plate so as to correctly position the light guide plate with respect to the light source. The spring member absorbs expansion and contraction of the light guide plate.

18 Claims, 7 Drawing Sheets

POSITIONING DEVICE FOR LIGHT GUIDE PLATE AND BACKLIGHT MODULE

FIELD OF THE INVENTION

The present invention relates to a technical field of liquid crystal display, and more particularly, to a positioning device for light guide plate and backlight module.

DESCRIPTION OF THE PRIOR ART

Backlight module is a vital and key component of the liquid crystal display. Since the liquid crystal panel does not have the capability of illumination, therefore, the backlight module will provide the necessary light beam to the liquid crystal panel. The key function of the backlight module is to provide a light source with sufficient brightness homogeneously distributed such that images and patterns on the liquid crystal display can be readily seen.

Figure 4:
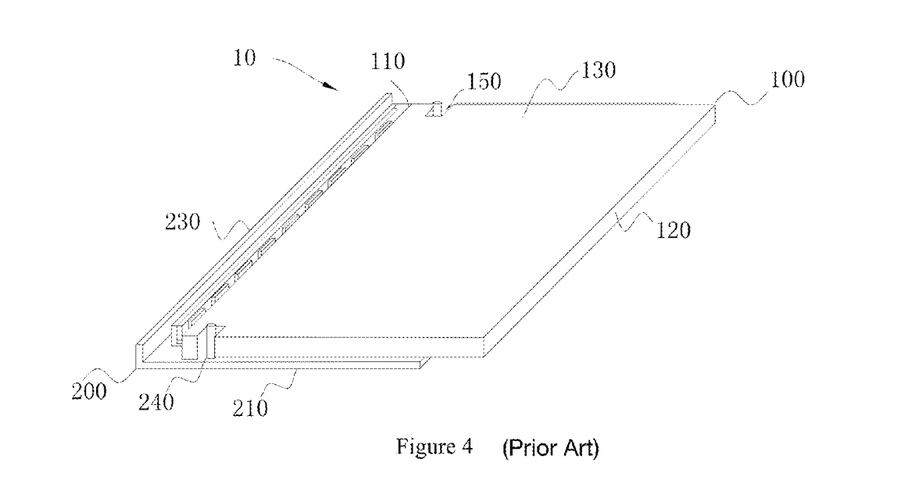
FIG. 4 is an illustrational configuration showing a light guide plate is positioned by prior art posts.

According to the existing technology implemented in the backlight module, the arrangement between the light source and the light guide plate divides into direct-type and side-type. The direct-type is the light source, such as the CCFL or LED are arranged into an array on the backlight module, and then with the help of a diffuser, a prism and optical film to transfer the light source into a surface light to light up the liquid crystal panel. The side-type means the light source is arranged on a side of the light guide plate, and then the light beam is projected into the light guide plate from the side. The light guide plate will then transfer the light source into a surface light to light up the liquid crystal panel. As shown in FIG. 4, the positioning of the light guide plate is shown. In general, the light guide plate 100 is defined with retaining holes 150, and the backboard 200 is formed with corresponding posts 240. With the engagements between the retaining holes 150 and the posts 240 of the backboard 200, the light guide plate 100 can be attached to the backboard 200.

Figure 5:
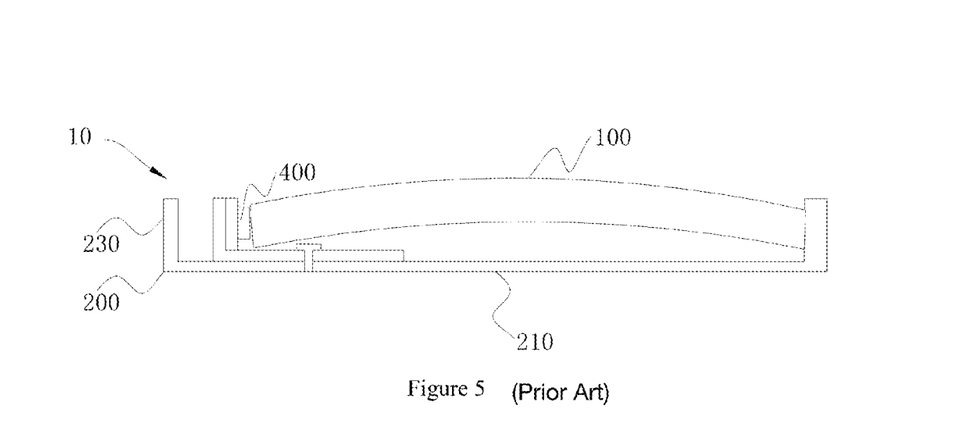
FIG. 5 is an illustrational configuration showing the light guide plate is suffered a warpage.

As shown in FIGS. 4 and 5, the LED 400 serves as light source, and when the working environment of the backlight module 10 is changed, specially, the light guide plate 100 will experience a heat-expansion as heat up by the heat generated from the LED 400, or on the other hand, the light guide plate 100 will also expand as it absorbs too much moisture. If the light guide plate 100 is in contact with the LED 400, there is a possibility that the LED will be damaged. In addition, the light guide plate 100 is held thereof by the posts 240 making it impossible to extend along the longitudinal direction. As a result, the light guide plate 100 will become warp. In order to prevent the light guide plate 100 from warping, additional space has to be spared for the light guide plate 100 making the distance between the light guide plate 100 and the LED becomes larger, thereby reducing the coupling rate. The quality of the backlight module will be negatively influenced Taking a 32 inches single-short-side-type backlight module as example, once the light guide plate made from polymethyl methacrylate, i.e. PMMA is saturated with moisture, its longitudinal dimension will increase about 1.5~2 mm. If this light guide plate is held with the traditional measurement, then about 1.5~2 mm space has to be set aside beforehand. If such as space is set aside for the expansion of the light guide plate, ten the overall coupling distance will be increased, and the overall backlight performance will be lowered about 20%.

Accordingly, there is a need to provide a positioning device for the light guide plate and also a backlight module incorporated such a positioning device so as to resolve the prior art deficiency.

SUMMARY OF THE INVENTION

It is an object of the present invention to provide a positioning device for light guide plate and a backlight module. In the design of a super-narrow-border of the side-type backlight module, a spring member and backboard are used to replace the original way of positioning, i.e. using the retaining posts to secure the light guide plate. As a result, the warpage of the light guide plate resulted from expansion of the light guide plate under high temperature and high humidity environment can be effectively resolved. When the light guide plate expands, the spring member will provide a buffer zone so as to prevent the light guide plate from warpage; when the light guide plate contracts, the spring member will still exert a pushing force to the light guide plate to ensure the coupling distance remained unchanged. This will increase the light quality of the backlight module. In addition, the positioning device can ensure reliable and durable positioning to the light guide plate.

In order to achieve the object set forth above, the present invention provides a positioning device for light guide plate which includes an incident surface, an light exiting surface adjoining the incident surface, and a surface opposite to the incident surface, characterized in that the positioning device of the light guide plate is configured by a backboard and a spring member mounted onto the backboard, wherein the light guide plate is securely positioned onto the backboard by the spring member which is disposed adjacent to the surface of the light guide plate, including a connector secured to the backboard; and a positioning hand having a fixing end interconnected to the connector, and a free end adapted to abut against the surface of the light guide plate so as to create an interaction therebetween.

Preferably, wherein the spring member is mounted onto a sidewall or a bottom of the backboard.

Preferably, wherein the spring member is made from metallic material or polymer.

Preferably, wherein the positioning hand and the connector are integrally formed.

Preferably, wherein the connector is a horizontal configuration, and the positioning hand is a curvilinear configuration.

Preferably, wherein the positioning hand and the connector are interconnected with a preset angle.

Preferably, wherein the positioning device includes two spring members.

Preferably, wherein the light guide plate is defined with a plurality of retaining holes adjacent to the incident surface, and the backboard is formed with a plurality of posts integrally formed with the backboard and corresponding to the retaining holes.

It is another object of the present invention to provide a backlight module including with a heatsink, a light guide plate which includes an incident surface, an light exiting surface adjoining the incident surface, and a surface opposite to the incident surface, a light source disposed on the heatsink and located adjacent to the incident surface of the light guide plate, wherein the backlight module further includes a positioning device for the light guide plate and is configured by a backboard and a spring member mounted onto the backboard, wherein the light guide plate is securely positioned onto the backboard by the spring member which is disposed adjacent to the surface of the light guide plate, including a connector secured to the backboard; and a positioning hand having a fixing end interconnected to the connector, and a free end adapted to abut against the surface of the light guide plate so as to create an interaction therebetween.

Preferably, wherein the heatsink is attached to the backboard by means of screws or rivet.

Preferably, wherein the spring member is mounted onto a sidewall or a bottom of the backboard.

Preferably, wherein the spring member is made from metallic material or polymer.

Preferably, wherein the positioning hand and the connector are integrally formed.

Preferably, wherein the connector is a horizontal configuration, and the positioning hand is a curvilinear configuration.

Preferably, wherein the positioning hand and the connector are interconnected with a preset angle.

Preferably, wherein the positioning device includes two spring members.

Preferably, wherein the light guide plate is defined with a plurality of retaining holes adjacent to the incident surface, and the backboard is formed with a plurality of posts integrally formed with the backboard and corresponding to the retaining holes.

As compared with the existing technology, the positioning device for light guide plate and the backlight module can be concluded with the following advantages. The spring member of the positioning device can readily deform to accommodate the expansion of the light guide plate while still keep the light guide plate in check in view of its position. As a result, the spring member properly provides a robust buffering zone for the light guide plate so as to prevent the later from warping. On the other hand, when the light guide plate expands when exposed with heat, the extension or warpage can readily damage the light source. As a result, since the warpage of the light guide plate can be avoided, the damage to the light source is also suitably prevented. Furthermore, the spring member is arranged on side of the incident surface, accordingly, when the light guide plate retracts, the potential energy of the spring member can readily bring it back to its original position so as to properly position the light guide plate with respect to the backboard. The incident surface is properly fixed by the posts or glue so as to accurately keep the coupling distance between the light guide plate and the light source. Accordingly, the coupling rate can be enhanced.

DETAILED DESCRIPTION OF PREFERRED EMBODIMENTS

In order to make the features and configuration of the present invention readily understandable, a detailed description of preferred embodiments along with accompanied drawings will be given herebelow. Wherein like elements are designed with identical numeral references.

Figure 1:
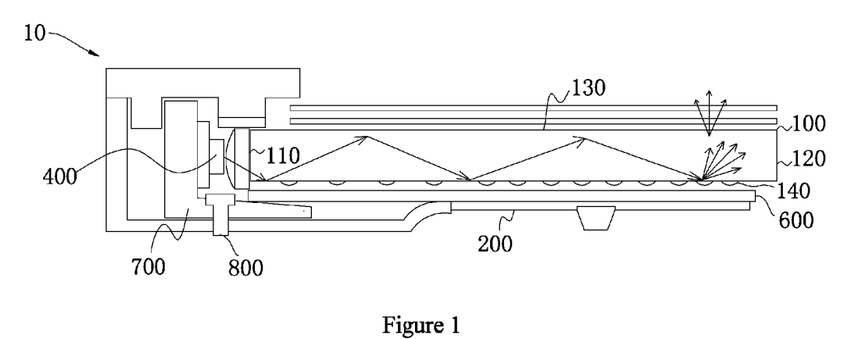
FIG. 1 is a working principle of a light guide plate of a backlight module made in accordance with the present invention.

As shown in FIG. 1, the working principle of the light guide plate 100 can be briefly described as below. In general, the light guide plate 100 is made from optical acrylic or polycarbonate material having high refractive index and low loss. The reflective spots 140 are printed over the acrylic base plate with UV screen-printing technology. The optic-class acrylic board will absorb light, i.e. the light beam comes out of the LED 400 will stay on the surface of the optic-class acrylic board. When the light beam projects from the incident surface 110 to the reflective spot 140, the refracted light beam will be diffused to different directions and angles. Then the refracted light beam will break through the light exiting surface 130 of the light guide plate 100 and project out of the light emitting surface 130. By arranging the reflective spots 140 with different density as well as the sizes, the light guide plate 100 can readily transform the a spot light from the LED 400 into a surface light. On the other hand, a refractive board 600 is provided to refract the diverted light beam back to the light guide plate 100 so as to increase the utilization rate of the light beam. The side-type light guide plate is to arrange the LED 400 on the side of the backboard 200, and then the light guide plate 100 will transfer the light beam into the central area of the screen so as to provide an overall brightness to the interface board. The light guide plate 100 is a key component to the backlight module 10, and the installation or mounting of it will directly affect the quality of the liquid crystal display.

Example I

Referring to FIGS. 6 to 12, the improvement of the present invention is primary focused onto the positioning of the light guide plate. The positioning device includes a backboard 200 and a deformable spring member 300 which can readily deform under external force, and resume to its original shape after the external force is removed. The spring member 300 can be made from metallic material or polymer. The positioning device can be readily implemented into a backlight module of a super-narrow-border liquid crystal display. According to the present invention, the backboard 200 includes a base 210, a pair of longitudinal sidewalls 220 interconnected to the base 210, and a pair of transversal sidewalls 230. The light guide plate 100 is disposed onto the base 210. The light guide plate 100 has a rectangular shape, and includes an incident surface 110, a light-exiting surface 130 adjoining the incident surface 110, and a side surface 120 opposite to the incident surface.

Figure 2:
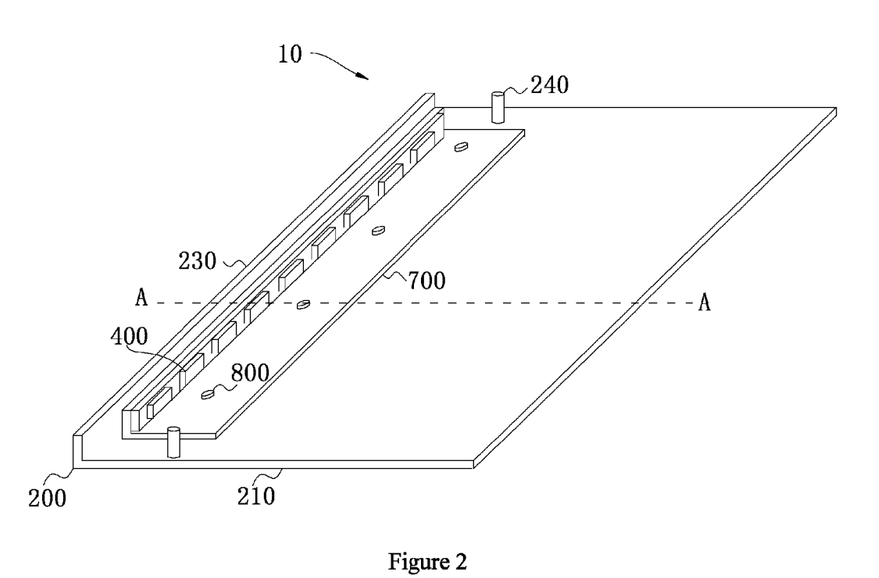
FIG. 2 is an illustrational configuration of a positioning device for a light source of the backlight module made in accordance with the present invention.
Figure 3:
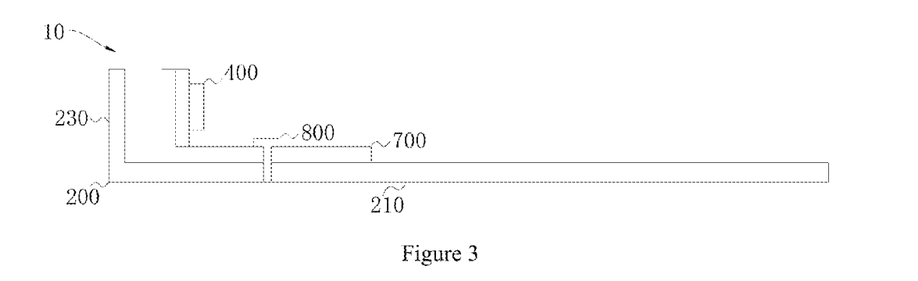
FIG. 3 is a cross sectional view taken along line A-A of FIG. 2.
Figure 7:
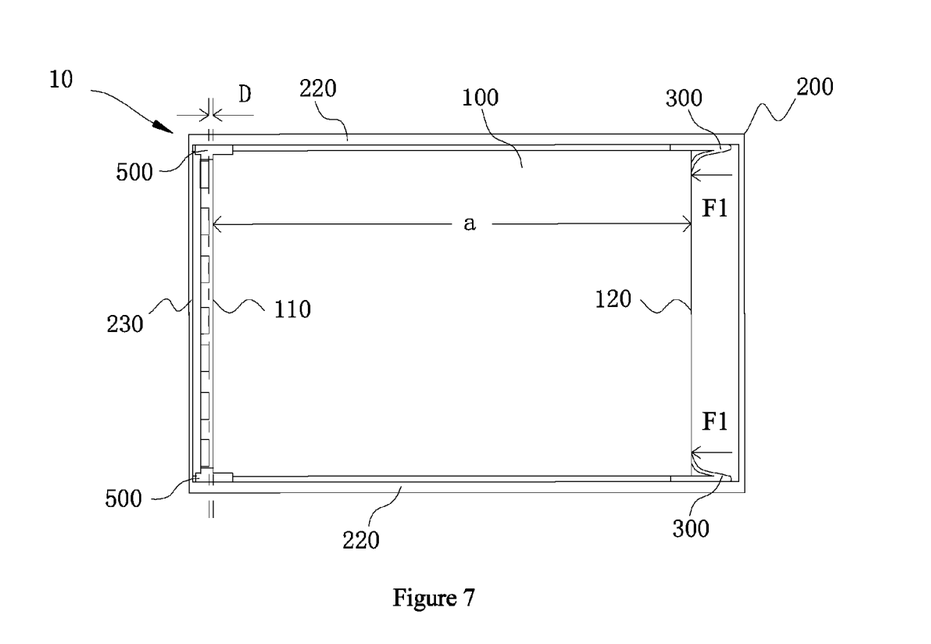
FIG. 7 is a top view showing an assembling of a positioning device for light guide plate in its initial stage in accordance with a first embodiment of the present invention.
Figure 9:
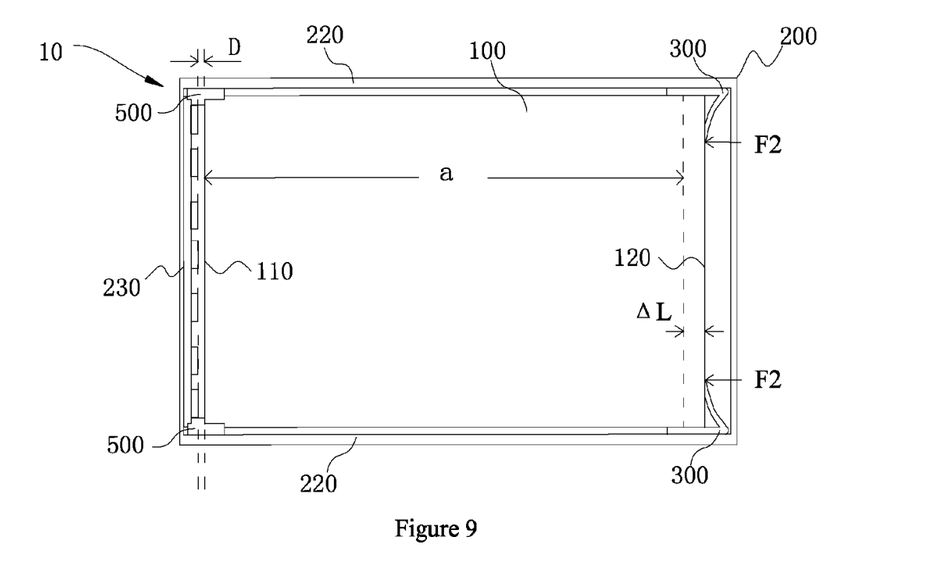
FIG. 9 is a top view showing the positioning device for light guide plate in its expanded stage in accordance with a first embodiment of the present invention.
Figure 11:
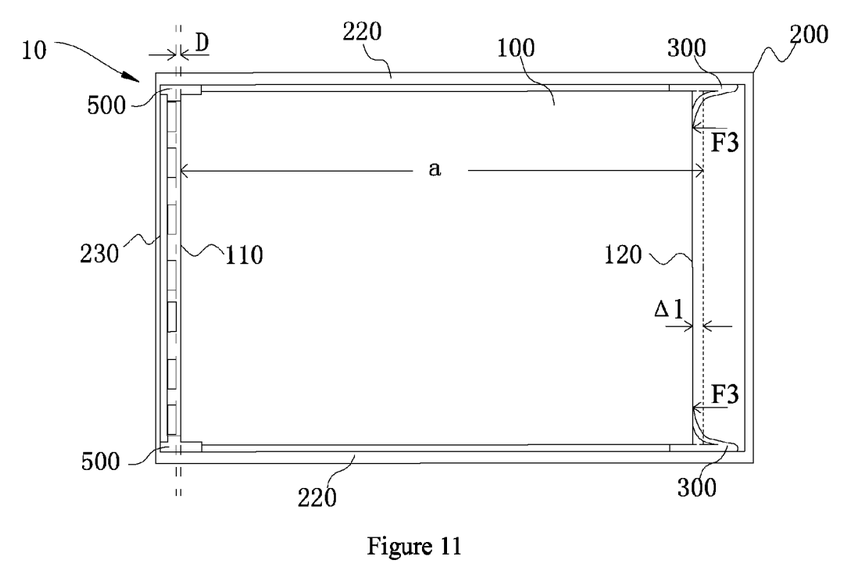
FIG. 11 is a top view showing the positioning device for light guide plate in its contacted stage in accordance with a first embodiment of the present invention.

In use, the LED 400 of the backlight module 10 is arranged adjacent to the incident surface 110, such as shown in FIGS. 2 and 3, the LED 400 is mounted onto a heatsink 700 and which is in turn mounted onto the base 210 in by ways of screws 800 or rivet (not shown in Figure) in a location adjacent to the transversal sidewall 230. The light beams from the LED 400 enter the light guide plate 100 from its short transversal side. As shown in FIGS. 7, 9 and 11, according to the preferred embodiments, the light guide plate 100 is securely mounted onto the base 210 by ways of rubber block 500 adjacent to the incident surface 110 of the light guide plate 100, and a spring member 300 is disposed on the side surface 120 of the light guide plate 100 which is distant to the LED 400. The rubber block 500 is securely mounted onto the ends of the short transversal sidewall 230 of the backboard 200, and is sandwiched between the light guide plate 100 and the heatsink 700 so as to prevent a collision between the light guide plate 100 and the LED 400.

Figure 6:
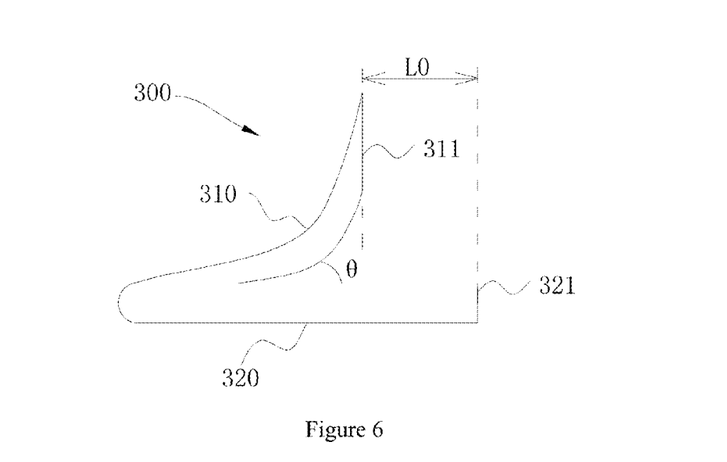
FIG. 6 is an illustrational configuration of a spring member.

As shown in FIG. 6, the spring member 300 includes a positioning hand 310 and a connector 320. The positioning hand 310 has a free end 311 and a fixing end which is interconnected to the connector 320 integrally. According to the present invention, the connector 320 is a horizontal configuration, and the positioning hand 310 has a curvilinear configuration. However, it should not be limited merely thereto. The positioning end 310 and the connector 320 are interconnected with each other with a preset angle, θ, and there is a preset distance $L_0$ between the free end 311 of the fixing hand 310 and a free end 321 of the connector 320. If the spring member 300 suffers a permanent deformation, then the maximum distance between the free end 311 of the positioning hand 310 and the free end 321 of the connector 320 is $L_M$.

Referring to FIGS. 6 to 12, in the current embodiment, the spring member 300 is securely attached along the longitudinal sidewall 220. According to the embodiment, the spring member 300 can be attached to the longitudinal sidewall 220 by ways of screws with its connector 320. Alternatively, the spring member 300 can be attached to the longitudinal sidewall 220 by suitable retaining mechanism (not shown) formed thereon with its connector 320. By this arrangement, the free end 311 of the fixing hand 310 will tightly press against onto the side surface 120 of the light guide plate 100 so as to tightly hold it on. Or alternatively, the fixing hand 310 can be defined with a retaining slot (not shown in Figure) so as to snugly hold the light guide plate 100 therein (not shown in Figure). However, since the development of the light guide plate 100 becomes more and more slim, if the mass production of the spring member 300 becomes a waste, then the light guide plate 100 can be readily positioned with the first embodiment.

Figure 8:
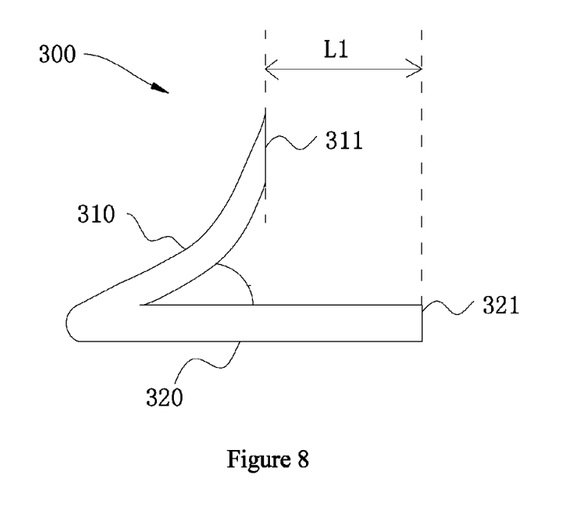
FIG. 8 is a partial illustration of the spring member shown in FIG. 7.

Referring to FIGS. 7 and 8, when the side surface 120 of the light guide plate 100 is held in position, since in the original status, the longitudinal length "a" of the light guide plate 100 is longer than the distance from the free end 31 to the incident surface 110 of the light guide plate 100. When the light guide plate 100 is installed, the side surface 120 will abut against the free end 311 of the fixing hand 310 mounted onto the longitudinal sidewall 220 of the base 210. Accordingly, the positioning hand 310 will start to deform as pushed by the light guide plate 100. In light of this, the positioning hand 310 is pushed to deform, and in return, it exerts a counter force $F_1$ to the light guide plate 100. With the action of the pushing force $F_1$, the light guide plate 100 is pushed toward the incident surface 110. However, since the light guide plate 100 is securely held by rubber blocks 500 in the area adjacent to the incident surface 110, there is not any displacement of the light guide plate 100 relative to the backboard 200, i.e. the coupling distance D is remained unchanged.

Figure 10:
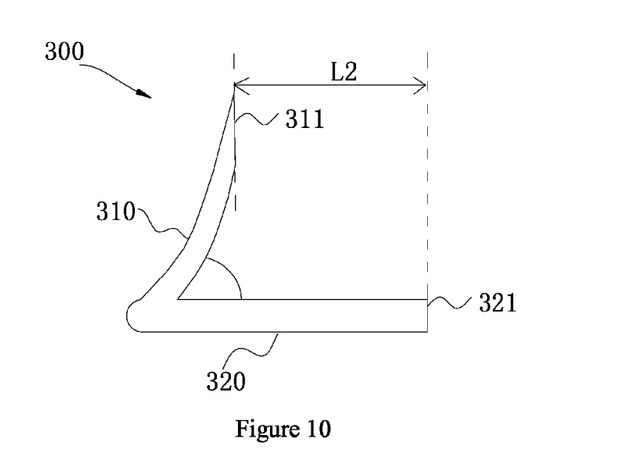
FIG. 10 is a partial illustration of the spring member shown in FIG. 9.

Referring to FIGS. 9 and 10, when the light guide plate 100 is operated under high temperature and high humidity environment, the light guide plate 100 will experience an expansion, and its overall length will increase a ΔL, and the spring member 300 is further compressed. In this condition, the free end 311 of the fixing hand 310 to the free end 321 of the connector 320 will increase to $L_2$, wherein $L_2=L_1+\Delta L$. Similarly, the spring member 300 will exert a force of $F_2$ to the light guide plate 100. Even under the operation of the force $F_2$, the coupling distance D is still properly kept. It should be noted that $L_2$ is still within under the permanent deformation range, i.e. $L_2<L_M$.

Figure 12:
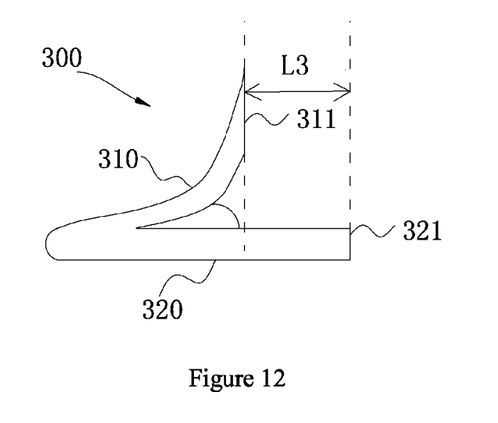
FIG. 12 is a partial illustration of the spring member shown in FIG. 11.

Referring to FIGS. 11 and 12, when the temperature and humidity drop, the light guide plate 100 will start to contract to resume to its original length, i.e. its overall length reduce to an amount of Δ1. As a result, a portion of the strain of the spring member 300 is released, and the distance between the free end 311 of the positioning hand 310 to the free end 321 of the connector 320 is changed to $L_3$, wherein $L_3=L_1-\Delta 1$. It should be noted that, $L_3$ is still within the allowable deformation ranges, i.e. $L_3>L_0$. The light guide plate 100 is still exerted with a force $F_3$ from spring member 300, and the coupling distance is still kept.

It is understandable that the shape of the spring member 300 can vary according different field requirements.

Example II

Figure 13:
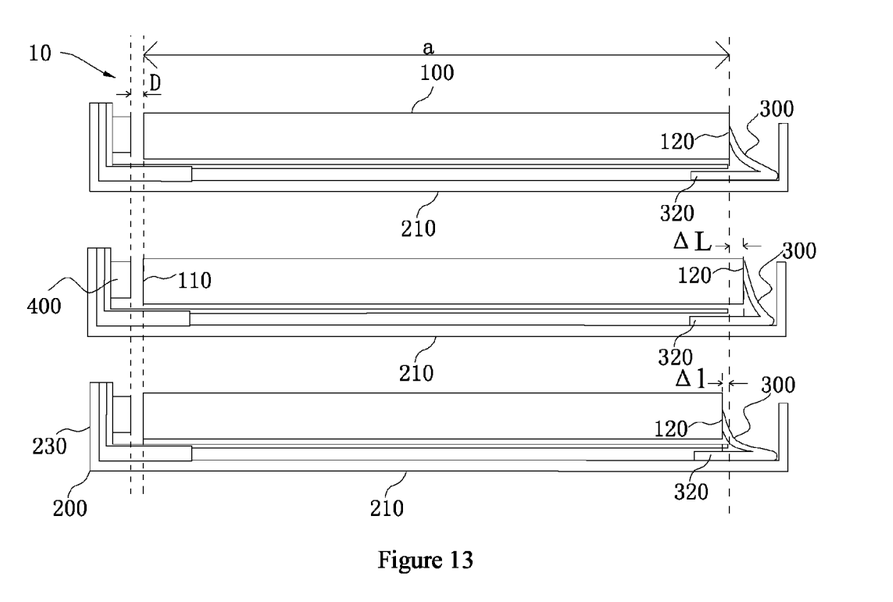
FIG. 13 is a cross sectional view of a positioning device made in accordance with a second embodiment of the present invention.

In Embodiment II, a positioning device for the light guide plate is similar to the positioning device for light guide plate disclosed in Embodiment I, but with the following difference, such as shown in FIG. 13. The spring member 300 is attached to the base 210 in relative position, i.e. the connector 320 of the spring member 300 is securely attached onto the base 210. Wherein the spring member 300 set along the sidewall 220 of the base 210 of the light guide plate 100 can be arranged more than two, instead of merely two. On the other hand, another different aspect with respect to Embodiment I is the light guide plate 100 is attached to the base 210 in adjacent to its incident surface 110 by posts 240 formed thereon. As shown in FIG. 4, the light exiting surface 130 is defined with a plurality of retaining holes 150 adjacent to the incident surface 110, preferably, there are two retaining holes 150 defined in this embodiment, and arranged close to transversal ends. The base 210 is integrally formed with posts 240 with respect to the retaining holes 150. By means of the interengagement between the retaining holes 150 and the posts 150, the light guide plate 100 can be readily attached to the backboard 200 in the area adjacent to the incident surface 110. Again, the coupling distance D between the incident surface 110 and the LED 400 is still kept constantly.

In conclusion, in order to prevent the disadvantages encountered by the prior art positioning device of the backlight module, the present invention provides the positioning device for light guide plate and the backlight module. The positioning device is configured with a backboard and a spring member which can readily deform when exerted with external force, and resume to its original position after the external force is removed. The spring member is in contact with the light guide plate and holds the light guide plate onto the backboard. The spring member is set to have a certain elastic modulus. When the light guide plate expands under heat or other reasons, the spring member will provide a buffer zone for the light guide plate and deform in accordance with the light guide plate. Once the light guide plate resumes to its original position, then the spring member resumes also back to its original position. As a result, the light guide plate is constantly kept in position by the positioning device made in accordance with the present invention.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A backlight module comprising:
a backboard having a plurality of integrally formed posts;
a light guide plate which includes an incident surface, an light exiting surface adjoining the incident surface, a side surface opposite to the incident surface, and a plurality of retaining holes corresponding to the plurality of integrally formed posts and positioned adjacent to the incident surface, the light guide plate securely positioned onto the backboard;
a positioning device mounted on the backboard and being at least one spring member comprising:
a connector configured to be secured to the backboard; and
a positioning hand having a fixing end interconnected to the connector,
and a free end adapted to abut against a side surface of the light guide plate.

2. The backlight module as recited in claim 1, wherein the spring member is mounted onto a sidewall of the backboard.

3. The backlight module as recited in claim 1, wherein the spring member is mounted onto a bottom of the backboard.

4. The backlight module as recited in claim 1, wherein the spring member is made from metallic material.

5. The backlight module as recited in claim 1, wherein the spring member is made from polymer.

6. The backlight module as recited in claim 1, wherein the positioning hand and the connector are integrally formed.

7. The backlight module as recited in claim 1, wherein the connector has a straight-flat shape, and the positioning hand is arc-shaped.

8. The backlight module as recited in claim 1, wherein the positioning hand and the connector are interconnected at a preset angle.

9. The backlight module as recited in claim 1, wherein the positioning device includes two spring members.

10. A backlight module comprising:
a heatsink;
a light guide plate which includes an incident surface, an light exiting surface adjoining the incident surface, and a side surface opposite to the incident surface;
a light source disposed on the heatsink and located adjacent to the incident surface of the light guide plate;
a positioning device including a backboard and a spring member mounted onto the backboard and disposed adjacent to the side surface of the light guide plate, the spring member further comprising:
a connector secured to the backboard; and
a positioning hand having a fixing end interconnected to the connector, and a free end adapted to abut against the side surface of the light guide plate so as to create an interaction therebetween,
wherein the light guide plate is securely positioned onto the backboard by the spring member; and
wherein the backboard has a plurality of integrally formed posts, the positioning device mounted on the backboard; and
the light guide plate includes a plurality of retaining holes adjacent to the incident surface, the plurality of integrally formed posts corresponding to the retaining holes.

11. The backlight module as recited in claim 10, wherein the spring member is mounted onto a sidewall of the backboard.

12. The backlight module as recited in claim 10, wherein the spring member is mounted onto a bottom of the backboard.

13. The backlight module as recited in claim 10, wherein the spring member is made from metallic material.

14. The backlight module as recited in claim 10, wherein the spring member is made from polymer.

15. The backlight module as recited in claim 10, wherein the positioning hand and the connector are integrally formed.

16. The backlight module as recited in claim 10, wherein the connector has a straight-plate shape, and the positioning hand is arc-shaped.

17. The backlight module as recited in claim 10, wherein the positioning hand and the connector are interconnected at a preset angle.

18. The backlight module as recited in claim 10, wherein the positioning device includes two spring members.

* * * * *